United States Patent [19]  [11] 4,254,243
Keck  [45] Mar. 3, 1981

[54] HALOGEN CONTAINING COPOLYESTER RESINS

[75] Inventor: Max H. Keck, Cuyahoga Falls, Ohio

[73] Assignee: The Goodyear Tire & Rubber Company, Akron, Ohio

[21] Appl. No.: 14,384

[22] Filed: Feb. 22, 1979

[51] Int. Cl.³ .............................................. C08L 67/02
[52] U.S. Cl. .................................... 525/444; 528/299
[58] Field of Search ......................... 528/299; 525/444

[56] References Cited

U.S. PATENT DOCUMENTS

| 2,912,409 | 11/1959 | Nischk et al. | 528/299 |
|---|---|---|---|
| 3,037,964 | 6/1962 | Bruson et al. | 528/299 |
| 3,883,611 | 5/1975 | Nelson | 525/444 |

Primary Examiner—Carman J. Seccuro
Attorney, Agent, or Firm—J. P. Ward

[57] ABSTRACT

The invention relates to copolyesters of ethylene terephthalate-tetrachlorobenzenedimethylene terephthalate. They can be random or block copolyester. The products have high second order transition temperatures and can be formed into products that can be sterilized.

6 Claims, No Drawings

HALOGEN CONTAINING COPOLYESTER RESINS

TECHNICAL FIELD

This invention relates to copolyesters of ethylene terephthalate-tetrachlorobenzenedimethylene terephthalate and to products made from these copolyesters.

PRIOR ART

Various ethylene terephthalate copolymers are known in the prior art. Perhaps the best known of such copolymers are the ethylene terephthalate-ethylene isophthalate copolymers. The properties of these copolymers vary according to their composition, especially, the second order transaction point which is lowered with increasing isophthalate content.

In contrast, the copolyesters of this invention have a reduced tendency to crystallize, have increased toughness and second order transition temperature (tg) higher than the second order transition temperatures other terephthalate copolyesters of similar composition.

The invention provides a series of new terephthalate copolyesters containing from about 2 to about 50 mol percent of tetrachlorobenzenedimethanol. They can be prepared by ester interchange of dimethylterephthalate with ethylene glycol and tetrachlorobenzenedimethanol in the proper proportions to form the desired copolyester and condensation of the ester interchange product to form polymeric polyester of high molecular weight. They can also be prepared by reacting terephthalic acid with ethylene glycol and tetrachlorobenzenedimethanol in the presence of low molecular weight polymer and condensing the product to form high molecular weight polymer. The polymeric polyesters produced are unique, tough clear polymers useful for molding applications and for the preparation of fibers and monofilaments.

BACKGROUND FIELD

For many molding applications, polyethylene terephthalate crystallizes much too rapidly. Although the undesirably high crystallization tendency of polyethylene terephthalate can be reduced by replacing part of the terephthalic acid or the glycol by compounds that by their constitution reduce the tendency of the resin to crystallize, most of such compounds have an adverse effect on the desirable properties of the polymer such as mechanical strength, solvent resistance, and abrasion resistance. Furthermore, such compounds generally reduce the glass temperature of the resin, thereby reducing the utility of the polymer. For example, the replacement of only 10 mole percent of the terephthalic acid in the polymer with glutaric acid drops the glass temperature from 73° to 59° C.

In contrast, the substitution of only 7 mole percent tetrachlorobenzenedimethanol for the ethylene glycol in polyethylene terephthalate actually raises the glass temperature from 73° to 83° and at the same time greatly reduces the tendency of the polymer to crystallize. (In this specification tetrachlorobenzenedimethanol is abbreviated TCBDM.) Furthermore, if the copolyester is made to contain only slightly more than 15 mole percent TCBDM the glass temperaof the resulting copolymer is well above 100° C. and now there is almost no tendency of the polymer to crystallizing. Thus, products made from the copolymer will not deform in boiling water, and indeed, are even steam sterilizable. It is obvious that such copolymers having glass temperatures above 100° C. will have a much greater range of applications than polyethylene terephthalate with its glass temperature of only 73° C. The desirable glass temperatures of these copolymers also points to uses as a high strength substrate for other polymeric films or coatings which have lower glass temperatures.

SUMMARY

The polyesters of the invention are random or block copolymers of ethylene glycol, tetrachlorobenzenedimethanol (TCBDM) and terephthalic acid. For ease of reading and understanding tetrachlorobenzenedimethanol is hereinafter abbreviated as TCBDM. In the random copolymers the TCBDM is monomeric. In the block copolymers the TCBDM is a polymeric ether of low molecular weight having a degree of polymerization from 2 to 5. The polymeric glycol ethers were prepared by heating the glycol in the presence of an acidic catalyst.

In the block copolyesters of the invention the blocks of poly TCBCM preferably have a degree of polymerization of from about 2 to 3, that is the number of consecutive repeating units of TCBDM in a chain will be 2 or 3. The range of polyethylene terephthalate blocks to TCBDM blocks will be from about 99 to 85% of the sum of the polyethylene terephthalate blocks and TCBDM blocks and the range of TCBDM blocks will be in the range of from 1 to 15% of said sum.

PREPARATION OF COPOLYMER

1. Random

A mixture of 23.27 grams of dimethylterephthalate, 21.4 grams of ethylene glycol, 8.28 grams of 2,3,5,6-tetrachlorop-xylene-$\alpha,\alpha'$-diol, 0.0070 g of manganese acetate and 0.0070 g of antimony trioxide were places in a glass reaction tube fitted with a stirrer and a side arm with a condenser. The mixture was heated for 120 minutes at 190° C. During this heating period 8.5 milliliters of methanol distilled out. The temperature was then raised to 250° C. and the pressure in the system was gradually reduced to 0.7 Torr over a 60 minute period. The temperature was raised to 275° C. and heating and stirring were continued for 135 minutes. The copolymer at this point was extremely viscous. The copolyester had an intrinsic viscosity of 0.515 measured in a 60/40 phenol-tetrachloroethane solvent mixture at 30° C.

2. Block Copolymers

Polymeric TCBDM is typically prepared as follows: 7 grams of TCBDM were charged into a reaction tube fitted with stirrer and a sidearm with a condenser in distilling position. A 0.0095 gram quantity of p-toluene sulfonic acid was added and the system put under $N_2$ atmosphere and heated at 250° C. At the end of 80 minutes the contents of the reactor had become a barely stirrable solid. Heating was discontinued. The reaction product was pulverized and extracted with boiling dioxane. The dioxane on cooling deposited 1.7 g of predominantly trimer of TCBDM, melting at about 275° C. The dioxane solution remaining after removal of the trimer was evaporated to about ⅓ its original volume to yield 2.35 g of predominantly dimer, melting at 210°-212° C. When the material considered to be predominantly trimer was extracted with boiling tetrahydrofurane THF) the very small amount of THF insoluble material was found to be a mixture of tetramer and pentamer, melting at 312°–326° C. A typical preparation of a block copolymer is as follows: 92/8 Ethylene/Poly TCBDM Terephthalate Block Copolyester.

DESCRIPTION OF PREFERRED EMBODIMENT

A mixture of 8.544 grams of dimethyl terephthalate, 2.788 grams of TCBDM trimer, 6.27 grams ethylene glycol, 0.0026 grams of antimony trioxide, and 0.0026 grams of manganese acetate was placed in a glass reaction tube fitted with a stirrer and a sidearm with condenser in distilling position This mixture was heated and stirred at 185° C. for 100 minutes after which time no more methanol was evolved. The mixture was then heated 15 minutes at 225° C. followed by 45 minutes at 260° C. Excess glycol distilled out during this period. The pressure on the system was gradually reduced to 0.3 Torr over a 10 minute period. The temperature was then raised to 275° C. and stirring was continued for 70 minutes. The melt viscosity of the resulting block copolymer was very high and the intrinsic voscosity was 0.590. The glass transition temperature of the block copolymer was 96° C.

A number of copolymers were prepared based on meta-TCBDM. Compositions of 97/3, 95/5, 90/10, 85/15 and 80/20 E/meta-TCBDM random copolymers were prepared and evaluated. The 85/15 and the 80/20 compositions exhibited little tendency to crystallize even on prolonged annealing. Molding of these materials was carried out without difficulty.

Polymer data are presented in Table 1: "Copolymers of E/m-tetrachlorobenzene dimethylene terephthalate."

TABLE I

COPOLYMERS OF E/m-Tetrachlorobenzene Dimethylene Terephthalate

| Composition E/TCBDM Tere-Phthalate Ratio | IV* | MP °C. | Tg °C. | Comments |
|---|---|---|---|---|
| 97/3 | 0.549 | 248° | — | Tube run. |
| 95/5 | 0.568 | 244.5° | — | One pound run. |
| 90/10 | 0.514 | 232° | — | One pound run. Crystallizes slowly at 135° C. |
| 85/15 | 0.554 | 222° | 94° | One pound run. Crystallizes very slowly at 135°. |
| 80/20 | 0.402 | | — | Crystallizes only slightly on prolonged annealing at 135°. A sample was molded into a strong 4 × 4" sheet without difficulty. |

*The melt viscosities of all of these copolymers were much higher than polyethylene terephthalate of about the same intrinsic viscosity and extrusion times from the one-pound reactor were also quite prolonged.

Strong fibers were spun from the 95/5 and 90/10 compositions.

Fiber data are presented in Table II.

TABLE II

FIBER PROPERTIES OF 90/10 and 95/5 E/m-Tetrachlorobenzene Dimethylene Terephthalate Copolymers

| | 90/10 Copolymer | 95/5 Copolymer |
|---|---|---|
| Denier | 126 | 168 |
| Tensile | 0.91 | 1.55 |
| Tenacity | 3.27 | 4.18 |
| Elongation | 12.6% | 19.2% |
| Shrink | 11.1% | 3.1% |
| Mod at 1% Elong. | 115 | 97 |

Copolyesters were also prepared from para-TCBDM.

Table III, "Terephthalate copolymers containing p-tetrachlorobenzenedimethylene (TCBDM) units" list the various compositions prepared and some of their properties. It is seen that all of the compositions prepared required annealing in order to obtain crystallization. In addition, the 75/25 and 50/50 compositions first had to be soaked in nitromethane for 30 minutes to initiate crystallization, the extent of which then gradually increased on prolonged annealing at 95° C. The 50/50 composition apparently did not crystallize to the extent necessary for detection via DTA.

Tg values gradually increased from 80° to 115° C. as the amount of TCBDM was increased from 4 mole percent to 25 mole percent. No Tg was detected for the 50/50 composition.

The 80/20, 75/25, and 50/50 random copolymers were found to be soluble in 1,1,2-trichloroethane and dioxane. They were insoluble in methyl ethyl ketone, tetrahydrofurane and toluene.

These copolymers were also observed to have abnormally high melt viscosity for a given IV value.

TABLE III

TEREPHTHALATE COPOLYMERS CONTAINING p-TETRACHLOROBENZENE-DIMETHYLENE (TCBDM) UNITS

| Composition (Mole %) | Intrinsic Viscosity | Melting Point (°C.) | $T_g$ °C. | Comments |
|---|---|---|---|---|
| 96/4 E/TCBDM Terephthalate | .628 | 247.5 | 81 | Crystallized only on being annealed. |
| 93/7 E/TCBDM Terephthalate | .653 | 235 | 83 | Crystallized only on being annealed. Polymer is very tough and difficult to cut. |
| 85/15 E/TCBDM Terephthalate | .470 | 221.5 | 99 | Crystallized only on being annealed. |
| 80/20 E/TCBDM Terephthalate | .515 | 172 | — | Soluble in 1,1,2-trichlorethane and dioxane. Insoluble in MEK. |
| 75/25 E/TCBDM Terephthalate | .460 | 167[1] | 115 | Soluble in 1,1,2-trichloroethane and dioxane. Insoluble in MEK, THF, and toluene. |
| 50/50 E/TCBDM Terephthalate | .410 | —[2] | None Detected | Soluble in 1,1,2-trichloroethane and dioxane. Insoluble in MEK, THF, |

TABLE III-continued
TEREPHTHALATE COPOLYMERS CONTAINING p-TETRACHLOROBENZENE-DIMETHYLENE (TCBDM) UNITS

| Composition (Mole %) | Intrinsic Viscosity | Melting Point (°C.) | $T_g$ °C. | Comments |
|---|---|---|---|---|
| | | | | and toluene |

[1] Crystallization was initiated by 30 minute soak in nitromethane. Prolonged annealing increased the degree of crystallinity.
[2] Crystallization was initiated by 30 minute soak in nitromethane. Prolonged annealing increased the degree of crystallinity but not enough to yield a DTA melting point.

TABLE IV
BLOCK COPOLYESTERS: ETHYLENE/POLY TCBDM TEREPHTHALATE

| Composition (Mol%) | DP of Polyether Block | Mp DTA | Tg | IV |
|---|---|---|---|---|
| 96/4 | HO-[CH2-C6Cl4-CH2-O]-H (1)* | 247.5° C. | 81° C. | 0.628 |
| 96/4 | HO-[CH2-C6Cl4-CH2-O]-H (2) | 256° C. | 90° C. | 0.831 |
| 96/4 | HO-[CH2-C6Cl4-CH2-O]-H (3) | 249° C. | 90° | 0.750 |
| 96/4 | HO-[CH2-C6Cl4-CH2-O]-H (4-5) (estimated from Mp) | 243° C. | 90° C. | 0.500 (opaque melt) |
| 92/8 | HO-[CH2-C6Cl4-CH2-O]-H (3) | prolonged annealing was required to obtain slight crystallinity | 96° C. | 0.595 |

*Random copolyer is included in the table to provide a basis for comparison of effect of degree of polymerization.

Block copolymers were prepared by using polymerized TCBDM as a monomer in place of monomeric TCBDM. The polymeric TCBDM glycol-ethers were prepared by reacting molten TCBDM in the presence of an acidic catalyst such as p-toluene sulfonic acid until the contents of the reactor had begun to turn solid at which point the reaction product consisted mainly of dimers and trimers. The dimeric glycol ether melted at about 210-212, and the trimeric glycol-ether at about 275° C. The dimer and trimer were separatable because of their differences in solubility in dioxane. (The dimer is fairly soluble in cold dioxane whereas the trimer is soluble only in boiling dioxane.) Extraction of the crude trimer with boiling tetrahydrofurane provided a very small amount of tetramer-pentamer mixture which was insoluble in THF.

The block copolymers containing polymeric TCBDM were readily prepared in the same manner as the random copolymers.

Examination of the data in Table IV shows that substituting dimerized TCBDM in place of monomeric TCBDM raises the Tg from 81° to 90° C. The use of the differential thermal analysis unit did not reveal a further increase in Tg as the degree of polymerization of the polymeric TCBDM was increased from 2 to a mixture of about 4-5 (estimated from the melting point).

The preparation of a 92/8 block copolymer of ethylene/poly TCBDM (trimer) terephthalate provided a Tg of 96° C. This block copolymer crystallized only to a slight extent on prolonged annealing.

These copolyesters have much higher than normal melt viscosities for a given IV value, and fibers and films of those copolymers appear to be more resilient than similarly shaped pieces of a polyethylene terephthalate polymer.

In view of the low tendency of these copolymers to crystallize, and because of the increased toughness compared to ethylene tere/iso copolymers, these copolymers would be particularly useful in special engineering plastics applications such as the molding of large containers where the thickness of the molded product would make it difficult or impossible to quench the crystallized product of ethylene terephthalate homopolymer.

These copolymers, especially those containing about 10 mole percent or more of TCBDM, will be found useful in both blow molding and in injection molding applications. The copolymers are far superior to polyethylene terephthalate and most other terephthalate-based copolyesters because of the abnormally high melt viscosity which prevents "sagging" due to excessive flow.

Because of the greatly reduced crystallization rate, the copolymers are also especially useful in the injection molding of large thick parisons which must be kept in the amorphous state for the subsequent re-heat blow molding operation. Large thick parisons cannot readily be molded from polyethylene terephthalate because the parisons cannot be quenched rapidly enough to prevent crystallization.

While certain representative embodiments and details have been shown for the purpose of illustrating the invention, it will be apparent to those skilled in this are that various changes and modifications may be made therein without departing from the spirit or scope of the invention.

I claim:

1. Random copolyesters comprising ethylene terephthalate/tetrachlorobenzenedimethylene terephthalate copolyesters wherein said copolyester consists of from 2 to 50 mole percent of tetrachlorobenzenedimethylene terephthalate units and correspondingly from 98 to 50 mole percent of ethylene terephthalate units.

2. The copolyester of claim 1 in which the tetrachlorobenzenedimethanol from which the tetrachlorobenzenedimethylene terephthalate units are formed is meta-tetrachlorobenzenedimethanol.

3. The copolyester of claim 1 in which the tetrachlorobenzenedimethanol from which the tetrachlorobenzenedimethylene terephthalate units are formed is para-tetrachlorobenzenedimethanol.

4. Copolyesters comprising ethylene terephthalate/(polytetrachlorobenzenedimethylene)terephthalate block copolyesters in which the polyethylene terephthalate blocks to the (polytetrachlorobenzenedimethylene) terephthalate blocks range from 99 to 85% of the sum of said polyethylene terephthalate and (polytetrachlorobenzenedimethylene)terephthalate blocks and the (polytetrachlorobenzenedimethylene)-terephthalate blocks to the polyethylene terephthalate blocks range from 1 to 15% of said sum.

5. The block copolyesters of claim 4 wherein the (polytetrachlorobenzenedimethylene) unit of the (polytetrachlorobenzenedimethylene)terephthalate block has a degree of polymerization ranging from 2 to 5 and preferably from 2 to 3.

6. The copolyesters of either claim 1 or claim 4 in the form of a shaped product.

* * * * *